United States Patent

[11] 3,594,843

[72] Inventors Bruno Sesia;
Carlo Sesia, both of 31 Strada Statale, Occimiano, Alessandria, Italy
[21] Appl. No. 773,558
[22] Filed Nov. 5, 1968
[45] Patented July 27, 1971
[32] Priority Nov. 2, 1966
[33] Italy
[31] 55925-A/66
Continuation-in-part of application Ser. No. 638,342, May 15, 1967, now abandoned.

[54] AUTOMATIC PLANT FOR WASHING VEHICLES
22 Claims, 24 Drawing Figs.

[52] U.S. Cl. ........................................................ 15/21
[51] Int. Cl. ....................................................... B60s 3/06
[50] Field of Search ........................................... 15/21 C, 53, 97, 320 CCP, 21C.3

[56] References Cited
UNITED STATES PATENTS
3,425,080 2/1969 Dolitzsch et al. ............. 15/21 (CO)
FOREIGN PATENTS
1,434,676 2/1966 France ......................... 15/CCP

*Primary Examiner*—Edward L. Roberts
*Attorney*—Sughrue, Rothwell, Mion, Zinn and MacPeak ABSTRACT: An automatic plant for washing motor vehicles includes a portal frame carrying a movable horizontal brush, a set of movable vertical brushes, and sprayers thereon. The portal frame and vehicle are moved relative to one another to effect the washing cycle while the brushes contact the surface of the vehicle. The horizontal brush repeatedly scrubs the front and rear end of the vehicle and is mounted such that it will provide a constant downward force and will follow the contour of the vehicle. The vertical brushes are together at the start and finish of the washing in front and rear of the vehicle but are moved apart a distance suitable to the width of the vehicle and are biased against the sides of the vehicle with a predetermined force during the washing.

AUTOMATIC PLANT FOR WASHING VEHICLES

CROSS-REFERENCE TO RELATED APPLICATIONS

This application is a continuation-in-part of our prior application Ser. No. 638,342 filed May 15, 1967 (now abandoned) which in turn claims priority from our Italian application filed Nov. 2, 1966.

BACKGROUND OF THE INVENTION

1. Field of the Invention

This invention relates to improvements in an automatic plant for washing motor vehicles such as passenger cars, and particularly to a plant of this type including a washing unit with rotary brushes and spray nozzles which moves relative to the motor vehicle.

2. Prior Art

It is known in the prior art to provide car wash installations utilizing movably mounted rotary brushes and spray nozzles. It is also known to utilize a portal frame with a set of brushes on vertical axes and a single vertically movable brush on a horizontal axis. However, the arrangements of the prior art have deficiencies in the mounting and control of these brushes and the automatic operation thereof so as to effect a complete and thorough car wash while providing a relatively simple plant.

SUMMARY OF THE INVENTION

This invention provides a car washing plant which is relatively simple and inexpensive and is of compact size while still being capable of performing a fully automatic and thorough wash including a first pass with a detergent and subsequent rinse and a return pass which may have water containing additives to provide a high luster on the car finish. The plant has a washing cycle which is not only automatic but completely and efficiently washes in reduced time so that the operation of the plant is rapid and the cost is inexpensive while providing high capacity in the number of vehicles washed. The car washing plant includes automatic controls so that the horizontal brush is capable of vigorously washing the front and rear end surfaces of the cars so that these need not be finished by hand as has been necessary with some other prior art arrangements. The car washing plant of this invention will not harm the surface of the finish of the vehicle being washed.

In accordance with these general features, the automatic car washing plant of this invention includes a portal frame which is movable relative to a car to be washed, for example by moving the frame along longitudinal guide ways, the frame carries a brush rotatable about a horizontal axis and movable in vertical guideways, this horizontal brush being adjustably supported and interconnected with a control arrangement so as to control the force with which the brush acts upon the vehicle body and to reciprocate the brush vertically to effect washing of the front and rear ends of the car. A set of additional brushes are rotatable about vertical axis and mounted on carriages which move transversely across the portal. The position of the vertical brushes being setable and automatically controlled. Two vertical planes of spray are arranged with the portal, and the entire operation is automatically controlled and programmed with regard to the sequence of washing steps.

Figure 1:
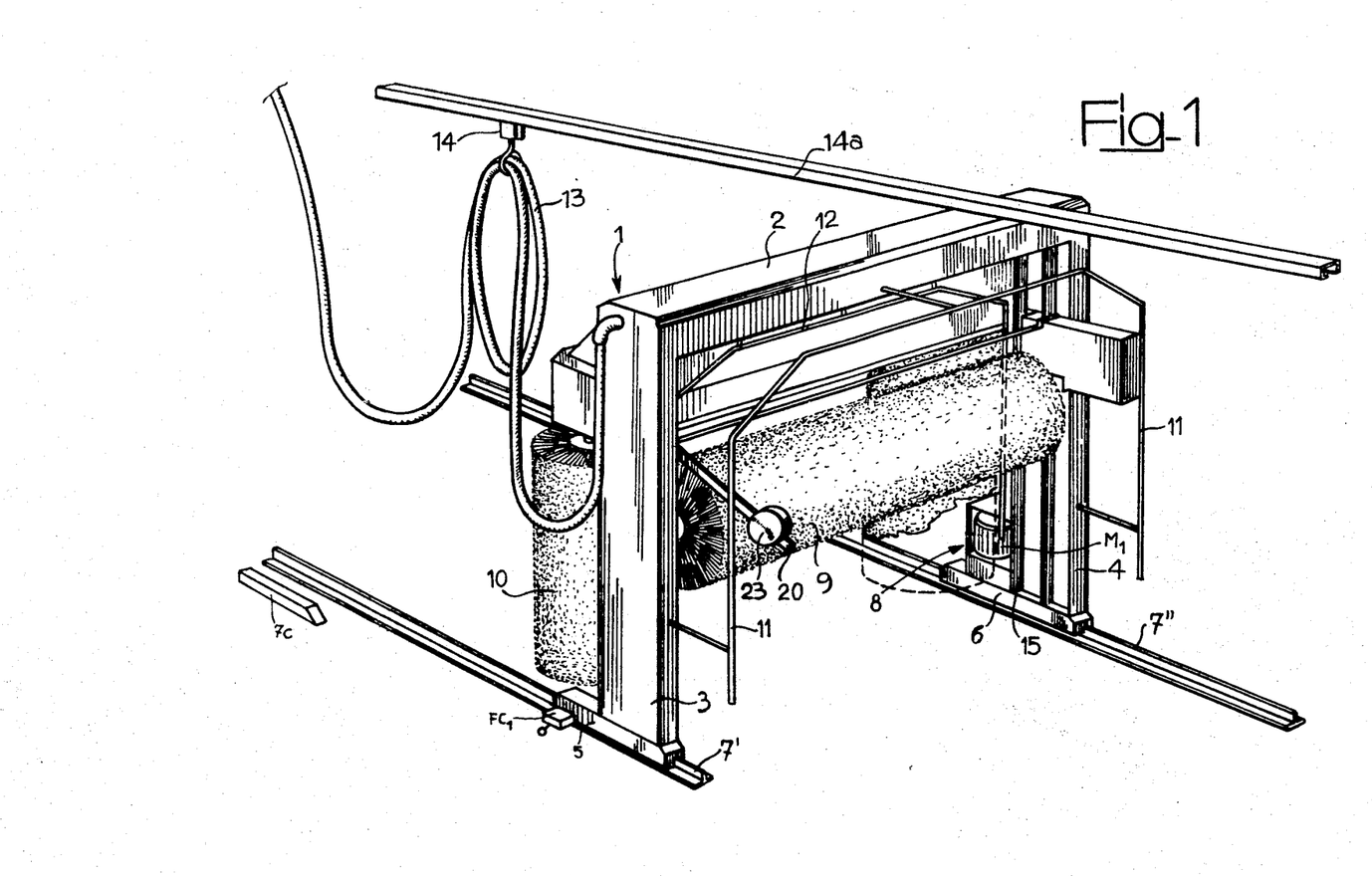
FIG. 1 is a perspective view of an automatic plant for washing vehicles according to the invention.
Figure 2:
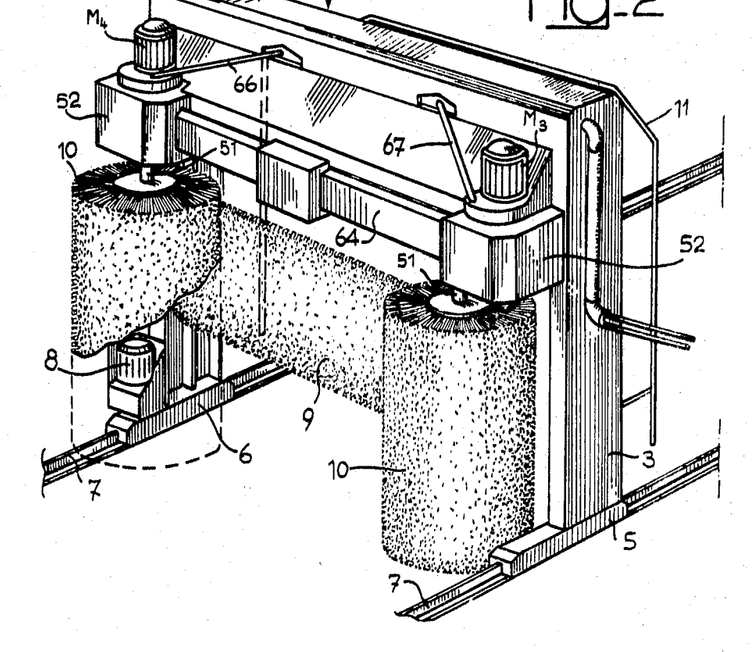
FIG. 2 is a perspective view of the plant of FIG. 1 from another side thereof.

In FIGS. 1 and 2, there is shown a portal frame 1 which supports all the components of the washing plant, the said frame comprising a top girder 2 arranged horizontally and two side pillars 3, 4 which are mounted on bottom supports 5, 6 respectively. These latter supports are provided with means for slidably engaging longitudinal guideways 7', 7'' which are secured to the floor of a site where the plant is to be installed, and are of a width such that the motor vehicles to be washed by the plant can drive without difficulty or risk through the portal. The bottom support 5 carries a microswitch FC1 the movable contact of which is raised by a cam 7C arranged near the guideway 7'' when the portal 1 is in its starting position along the guideways 7', 7''. One bottom support 6 is provided with propulsion means 8 which move the portal along the guideways 7', 7'' in either direction and these means comprise a driven reduction gear unit driven by the motor M1 and connected, by means of a friction device, to a pair of driven wheels, which are not shown inasmuch as they are known in the art and therefore not claimed per se. Such an arrangement avoids any accidents to the plant or to the vehicle due to obstructions or collisions.

The portal 1 carries a brush 9 which is rotatable about a horizontal axis and is arranged to be vertically slidable within the portal. The portal also carries two brushes 10 which are rotatable about vertical axes and are arranged to be slidable in a horizontal direction so as to be movable apart or together, as required. The portal 1 is also provided with both a first set of nozzles 11a which are distributed over a pipe 11 of portal shape slightly spaced from one open end of the portal, and a further set of nozzles 12a which are carried by a pipe of portal shape 12 within the said portal 1. This latter pipe 12 is situated in a plane parallel with the plane in which the pipe 11 is arranged and the two pipes 11, 12 are fed with suitable liquids through flexible supply pipes 13 leading from a central feed or pumping unit, not shown. The supply pipes 13 are supported by at least one slide 14 which is movable along an overhead monorail 14a.

Figure 3A:
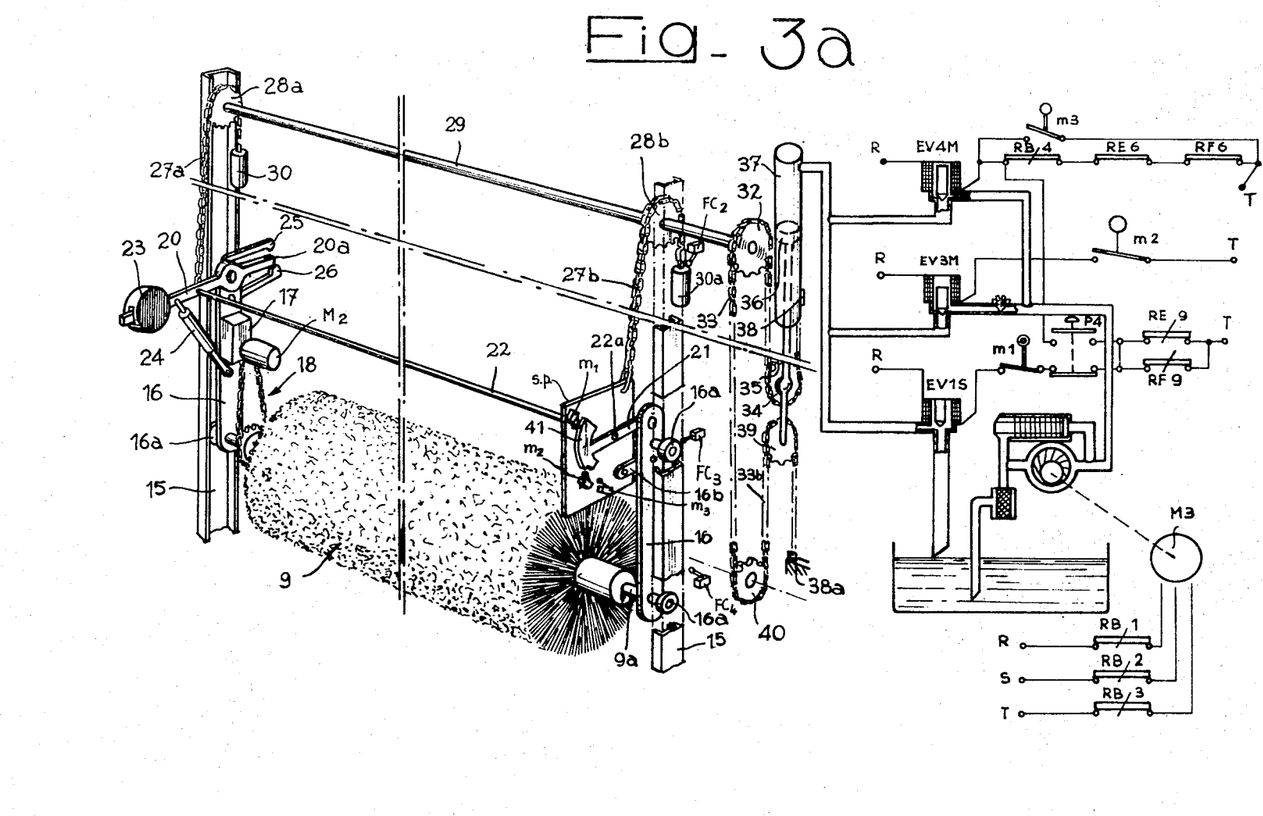
FIG. 3a is a part perspective view showing the horizontal brush unit incorporated in the plant in its lower position, and a part diagrammatical view illustrating means for controlling vertical displacements of the horizontal brush.

As shown in FIG. 3a the horizontal brush 9 is so mounted as to act on the vehicle body under a constant predetermined load thereby to avoid damaging the body. The brush is operated by control means which cause it to reciprocate in a vertical direction in order to repeatedly wash the front and rear end faces of the vehicle, as will be now described.

The horizontal brush 9 is fixedly secured to a shaft 9a which is supported by two side rods 16 each provided with a pair of rollers 16a arranged to ride in vertical guideways 15 one of which is visible also in FIG. 1. These latter guideways 15 are secured within the pillars 3 and 4 of the portal 1. One of the rods 16 supports a reduction gear unit 17 driven by the motor M2 and connected by a sprocket chain drive 18 with the brush 9 for rotation of the latter. The rollers 16a slide in guideways 15 and the two rods 16 have each pivoted thereto at their top end a lever 20, 21 respectively, these levers themselves pivot about their support on rods 16 and are connected by a transverse shaft 22 the free ends 22a of which project outwardly of the levers. One lever, in the illustrated embodiment the lever 20, carries at or near its free end an adjustable weight 23 which is chosen to balance the greatest part of the brush weight, so that the unit comprising the brush 9 and two rods 16 may freely move vertically with an oscillation of the levers 20, 21 about their axis on the rods and corresponding rotation of the shaft 22 about its axis. Thus the brush 9 bears on the motor vehicle being washed only with a constant and predetermined load.

As a refinement, the lever 20 is also connected to its rod 16 via a shock absorber 24 to prevent sharp relative angular displacements of the said two components. Furthermore, the lever 20 is provided with a rear extension 20a arranged to cooperate with two stops 25, 26 which are carried fast with the rod 16. This arrangement limits the angular movements of the lever 20 and thence of the lever 21 to a desired extent.

The free end of the transverse shaft 22 carrying the lever 20 is linked to one end of a sprocket chain 27a which chain travels over sprocket wheel 28a arranged on a top transverse shaft 29 rotatably supported by the portal structure. The other end of the shaft 22 carrying the lever 21 is mounted rotatably in an opening of a supporting plate s.p. linked to one end of a second sprocket chain 27b which travels over sprocket wheel 28b keyed on the said transverse shaft 29. The supporting plate s.p. is connected to the adjacent rod 16 by means of a short arm 16b pivotally linked to both plate s.p. and rod 16. The sprocket chains 27a and 27b are each counterweighted by a weight 30, 30a, respectively, the weight 30a being adapted to cooperate with three microswitches $FC_2$, $FC_3$ and $FC_4$, respectively, upon vertical displacement of the said weight. The function and operation of this arrangement will be detailed hereinafter.

The top shaft 29 carries a wheel 32 for a further chain 33, one end section 33a of which chain travels over a further wheel 34 carried by the rod 35 of a piston 36 which is arranged for vertical displacement within a fluid pressure cylinder 37 carried inside of the pillar 4. The sprocket chain section 33a is attached at 38 to the stationary outer wall of the cylinder CO or to any other suitable anchoring point nearby. A bottom end section 33b of the chain travels over a wheel 40 rotatable about a stationary pivot (not shown) supported inside the pillar 4, is guided by a wheel 39 fast with the rod 35 of the piston 36 and is attached to an anchor catch 38a stationary with respect of the lower end of the pillar 4. As will be evident, flow of pressure fluid to the cylinder 37 will result in a lowering of the set of wheels 34, 39 and this will so rotate the shaft 29 (in a clockwise direction as seen in FIG. 3a) as to lift simultaneously the transverse shaft 22, the horizontal brush 9 and the balancing weights therefor together with the rods 16. When the pressure fluid is exhausted or released from the cylinder 37, the piston 36 will rise and the shaft 29 will rotate in an opposite (counterclockwise) direction to lower the shaft 22, the brush 9 and the other components of the movable unit just mentioned above.

The lever 21 carries a shaped cam 41 which is arranged to cooperate with three microswitches $m_1$, $m_2$ and $m_3$, respectively, fast with the plate s.p., each of which operates a magnetic valve for the hydraulic circuit of the cylinder 37. This circuit, as shown in the diagrammatical part of FIG. 3a, includes a pump 43 driven by a motor M6, fed from a reservoir 44 and having a delivery conduit 45 which is subdivided into two branch conduits 45a, 45b. These latter branch conduits connect with a supply conduit 42 for the cylinder 37.

The two branch pipes 45a, 45b are controlled by two magnetic valves EV 4M, EV 3M, respectively, these valves being respectively operated by two of the above mentioned microswitches, namely switches $m_2$ and $m_3$. The conduit 42 is connected also with an exhaust pipe 48 which leads into the reservoir 44, such connection being controlled by a further magnetic valve EV 1S. This valve is operated by the further microswitches of the above-mentioned set, namely switch $m_1$.

This operating arrangement for the horizontal brush 9 functions as follows:

By a suitable choice of position for weight 23, both the lever 20 and the lever 21 are arranged to adopt a horizontal position. The arrangement may now be said to be balanced. Thereafter, the slightest upward thrust on the brush 9 will be sufficient to cause the latter to rise with respect to its initial position with consequent downward rotation of the pivotal parts about the axis of the shaft 22. In practice, however, the position of the weight 23 is so adjusted that the thrust necessary for lifting the brush 9 with respect to the axis of the shaft 22 ranges from between 1.5 to 3 kgs., this corresponding substantially to the total weight with which the brush 9 acts on the body of the vehicle being washed.

In such a condition of rest, with the brush weighted for instance by 3 kgs. with respect to its balanced condition, the brush will of course sink with respect to the axis of the shaft 22 and will rotate the levers 20 and 21 through whatever angle is permitted by the mechanical stop 26. In this way that portion of the lever 21 which supports the cam 41 is lifted and engages and closes the microswitch $m_1$ 1 thereby closing the circuit of the exhaust valve EV 1S so that pressure fluid is released from the cylinder 37 and the whole unit comprising the brush 9, the side rods 16, the transverse shaft 22, the levers 20 and 21 and the weight 23 moves downwardly, towards the position shown in FIG. 12.

Assuming now that the brush 9 is rotated in a clockwise direction and rolls over the body of the vehicle being washed as the latter moves forward relative to the portal frame 1, the said brush 9 will eventually come into contact with the front portions of the vehicle body. Also as this forward movement progresses the brushing action will increase in vigor and this will result in an upward thrust on the brush shaft 9a. In this way the brush 9 is lifted and the weight 23 lowered. The cam 41 follows rotation of the lever 21 and first releases the microswitch $m_1$ which stop the outflow of pressure fluid from the cylinder 37. Then the cam 41 successively engages the further two microswitches $m_2$, $m_3$ and these successively open the magnetic valves EV 3M, EV 4M and cause the flow of pressure fluid to the cylinder 37 to recommence, so lifting the horizontal brush unit again.

Raising of the brush unit causes a partial withdrawal of the brush 9 from the vehicle body and this reduces the extent of upwardly directed thrust on the whole unit. The cam 41 is thus again displaced and the magnetic valves EV 3M, EV 4M closed to shut off the supply of pressure fluid to the cylinder 37. In this way the brush is stopped in the position it has adopted. This happens of course if the brush is not weighted. When, as it is practically the case, it is weighted the switch $m_1$ will be actuated and the brush unit descends, as disclosed above. This latter position is maintained until a change in profile of the car body alters the balance which has been established and effects a fresh displacement of the brush 9 and cam 41 in either direction. When this happens the unit including the brush 9 is moved either correspondingly upwards or downwards.

The provision of two supply valves EV 4M, EV 3M permits a differentiation in degree of supply of pressure fluid into the cylinder 37 with a corresponding increase in upward movement of the brush 9. There is thus quicker response of the device to sudden changes in profile of the vehicle body.

The sidewalls of the vehicle are washed by the two brushes 10 which are rotatable about vertical axes and slidably mounted (see FIG. 4) in a horizontal guideway 64 which extends parallel with one and face of the portal frame 1. Each brush 10 is supported by a shaft 51 which extends into a carriage 52 and the top end of each shaft 51 carries a sprocket wheel 53 (see FIG. 5) connected by a sprocket drive chain 54 to a motor M3 and M4, respectively, incorporating a reduction gear (not shown). This is best seen from FIGS. 4 and 5.

Each carriage 52 is provided (see FIG. 5) with a top ledge 56 and a bottom ledge 57 which latter is adjustable by screw threaded means 58, 59. Both ledges 56, 57 are respectively provided with rollers 60, 61, the rollers 60 having oppositely inclined axes, as do the rollers 61. The said rollers 60, 61 are arranged respectively to engage rolling tracks 62, 63 formed by bevelled top and bottom edges of a guideway 64 which is fast with the portal 1. The pairs of rollers 60, 61 arranged as detailed above allow for any eccentricity of the load, suitable adjustment by means of the said rollers reducing the friction opposing movement of the carriages 52.

Figure 4:
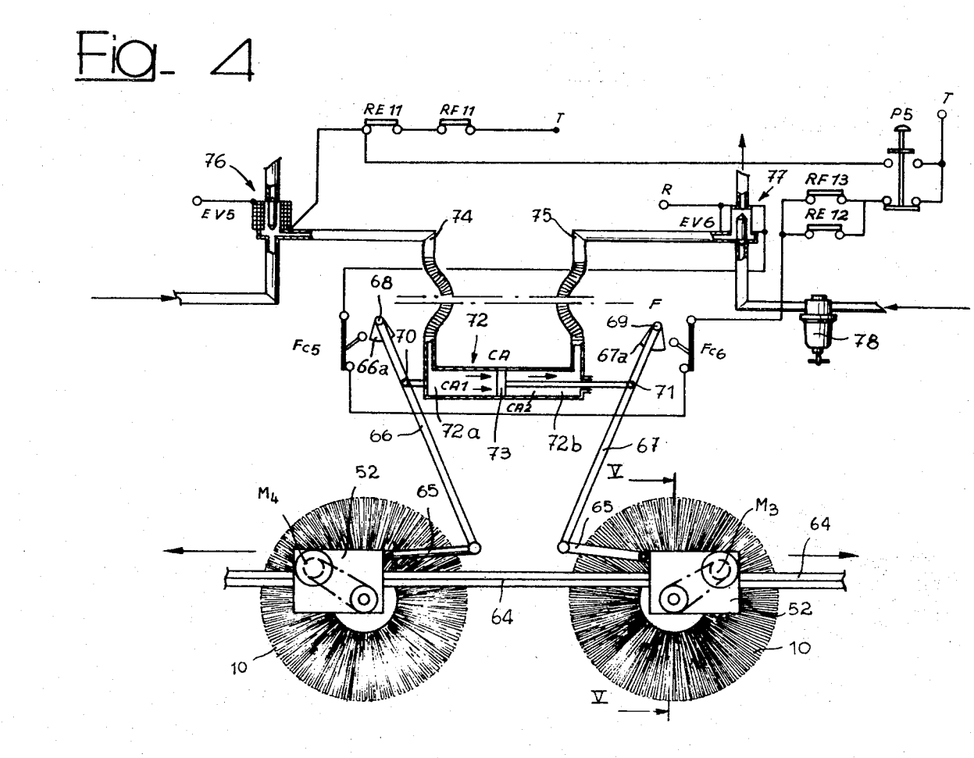
FIG. 4 is a diagrammatical plan view illustrating control means for two vertical brushes incorporated in the plant.

As shown in FIG. 4, the two carriages 52 for the vertical brushes 10 are interconnected by an arrangement comprising two rods 65 each pivoted to one end of oscillatable levers 66, 67, the latter levers being each pivoted at their other end to a pivot pin 68, 69 respectively stationary inside the top girder 2 of the portal frame 1 and intermediately at 70, 71, respectively, to an outer casing C of cylinder CA and to the free end of the rod 73a of the piston 73 of a double-acting fluid pressure cylinder freely interposed between the two levers. The two chambers CA1 and CA2 of the cylinder are fed through flexible pipes 74, 75 via electromagnetically operated valves EV5, EV6, respectively, and an adjustable pressure reducer 78 at the inlet side of the valve EV6.

The pressure cylinder CA is preferably fed with compressed air and by means of this cylinder the mutual spacing of the two vertical brushes 10 can be varied at will. By admitting air under pressure to the chamber CA1 of the cylinder CA through flexible pipe 74 the said cylinder CA is moved away from the piston 73 to the left of FIG. 4 and the brush carriages 52 are driven apart. On admission of air under pressure to the other chamber CA2 through flexible pipe 75, opposite circumstances exist and the two carriages are drawn together.

Under normal operating conditions the air pressure in the cylinder CA is kept constant at a predetermined value, so that the said cylinder can act as return spring and so permit the brushes to move apart and together again to suit the plan profile of a vehicle body being washed. At the front and rear ends of the vehicle body the cylinder CA is operated to draw the two brushes together into or towards mutual contact so as to complete washing of the said ends of the vehicle. On completion of the washing and rinsing cycle the two brushes 10 are driven fully apart concurrently with the lifting off of the horizontal brush 9, thereby to allow forward free exit of the vehicle. At the ends of the levers 66, 67 pivoted on the pins 68, 69, there are secured cams 66a and 67a, respectively, adapted to cooperate with normally closed microswitches FC5 and FC6 in series with the winding of the valve EV6, in order to stop the outward movement of the brushes 10, when one of them has reached its extreme outward position.

Figures 5, 6, 7:
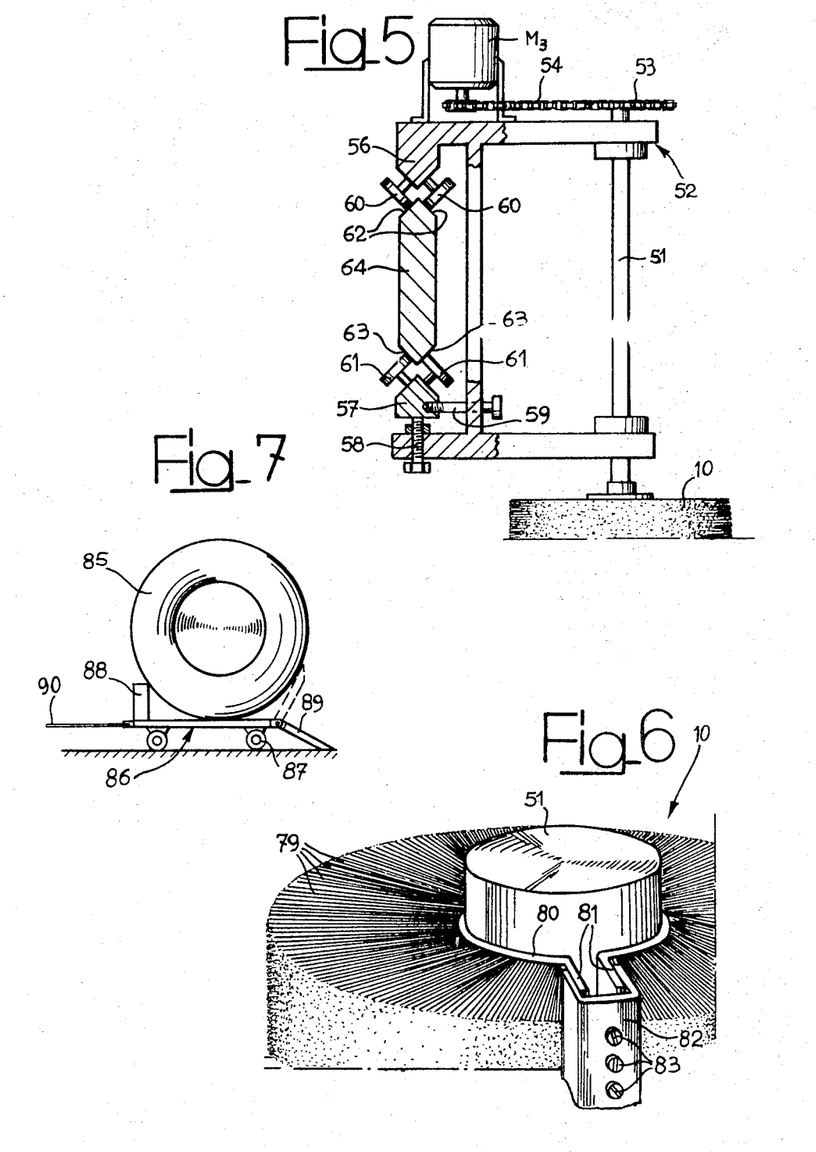
FIG. 5 is an axial sectional view on an enlarged scale of a carriage supporting such a vertical brush, the section being taken along line V-V of FIG. 4.
FIG. 6 is a perspective view showing in detail the mode of assembly of the brush bristles of the brush shafts.
FIG. 7 is a diagrammatical side view showing an accessory for the plant used to facilitate movement of a motor vehicle being washed.

In FIG. 6 there is shown a detail of a brush, in this figure there being visible the mode of assembly of bristles on the shaft of any of the various brushes. Purely by way of example, one of the vertical brushes 10 is shown as having a plurality of bristles 79 mounted on flexible annular elements 80 which are fixed to the shaft 51. Each element 80 has two radial wings 81 which are engageable by a connecting member 82 of short strap form which is secured, by means of screw 83, to the body of the shaft 51, of course, the strap does not contact the vehicle during washing.

FIG. 7 shows an accessory component of the plant in the form of an auxiliary slide 86 which is adapted to engage a pair of wheels 85 of a vehicle being washed. In this way the vehicle may be conveniently moved forward with respect to the portal frame 1, such an arrangement reducing the space necessary for the washing stroke, as the forward movement of the vehicle is readily correlated with movement in an opposite direction of the portal 1. The slide 86 is provided with wheels 87 and has both a stationary forward stop board 88 and a sumping tail board 89 so that the front or rear wheels of the vehicle may ride over the board 89 and thereafter be retained in position by elevation of the said board 89. The slide 86 is positively moved between the two guideways 7 of the plant either by a traction rope 90 or by any other suitable hauling mechanism.

Figures 8, 9, 10, 11, 12:
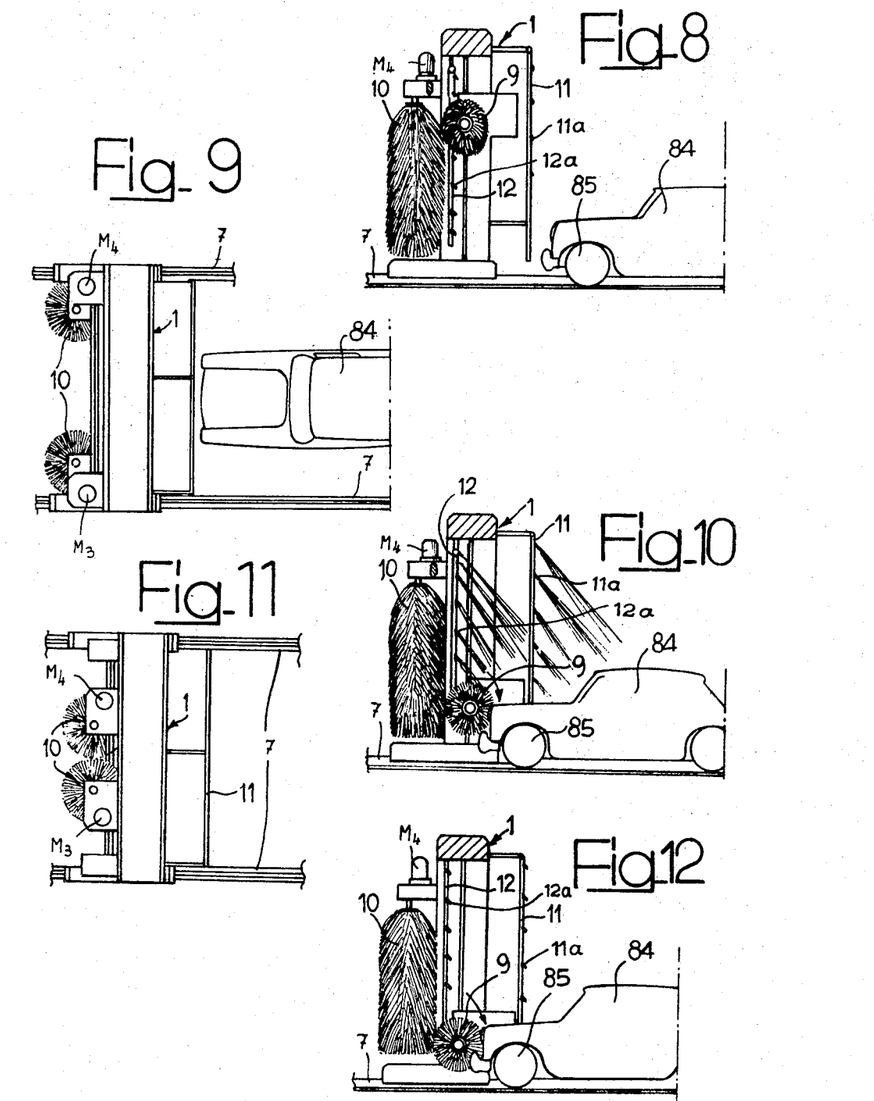
FIGS. 8 to 17 diagrammatically show, in mixed and various vertical sectional and plan views, various steps of the washing cycle for a motor vehicle.

Operation of the plant to wash a vehicle 84 in an automatic cycle is broadly as follows:

As shown in FIGS. 8 and 9, the horizontal brush 9 is initially in its top position and the two side brushes 10 are initially separated to their maximum extent, all the brushes being thus in their inoperative position. The two sprayer sets 11, 12 are similarly inoperative.

As shown in FIGS. 10 and 11, on commencement of the washing cycle, the vertical brushes 10 are drawn together and the horizontal brush 9 is lowered and rotated in a clockwise direction as viewed in the drawing. At the same time the portal frame 1 is set in motion towards the right of the said figures and the sprayers 11, 12 are fed with prewash water and with water and detergent, respectively.

When the horizontal brush 9 comes into contact with the front portion of the body of the vehicle 84, as shown in FIG. 12, the said brush is pushed upwardly in the manner described above. The rising brush lowers the weight 30a (see FIG. 3a), which operates the microswitch FC2 to actuate a timer unit (not shown) which periodically reverses, in accordance with predetermined cycles, the direction of rotation of the brush 9. On each reversal the direction of thrust on the brush 9 is also reversed, so that the cam 41 alternately opens and closes the microswitches $m_1$, $m_2$ and $m_3$, thereby vertically reciprocating the brush unit including the horizontal 9. The portal frame 1 is at this stage stopped so that the plant repeatedly washes the front portions of the vehicle.

Figure 13:
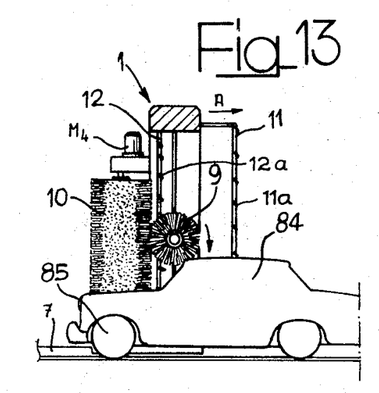
Figure 14:
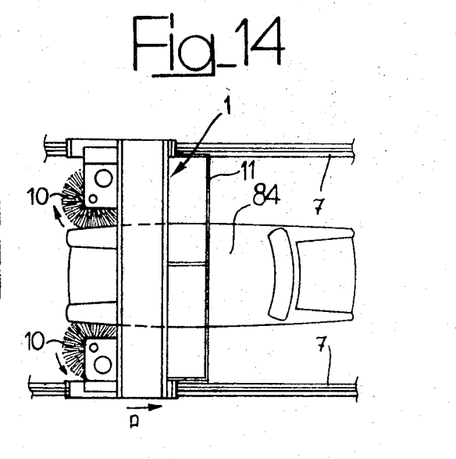

When the time set by the timer has elapsed, the portal frame 1 is again set in motion and the horizontal and vertical brushes 9 and 10 are rotated in order to wash the top portion and side portions of the body as is shown in FIGS. 13 and 14.

Figure 15:
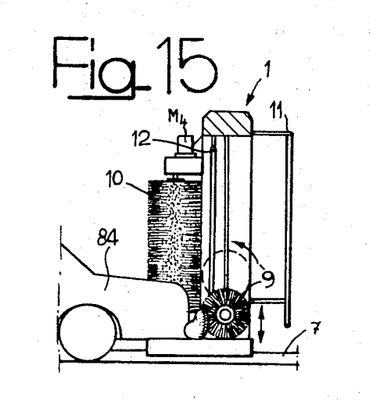

When the horizontal brush 9 reaches the rear end portions of the vehicle the portal frame is stopped. A further operation of the timer effects a repeated raising and lowering of the brush and its alternate rotation in either direction so as to wash the vehicle rear. At this stage, which is shown in FIG. 15, the rotation of vertical brushes is stopped.

Figure 16:
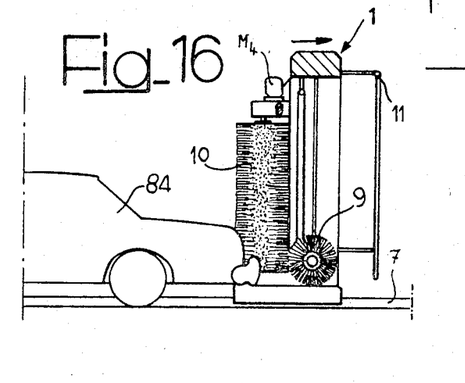
Figure 17:
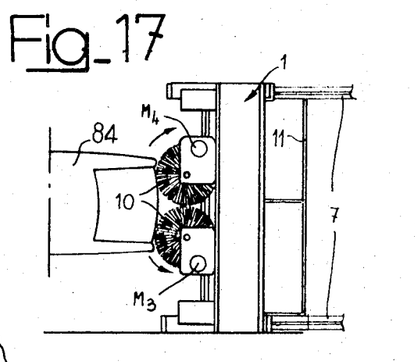
Figure 18:
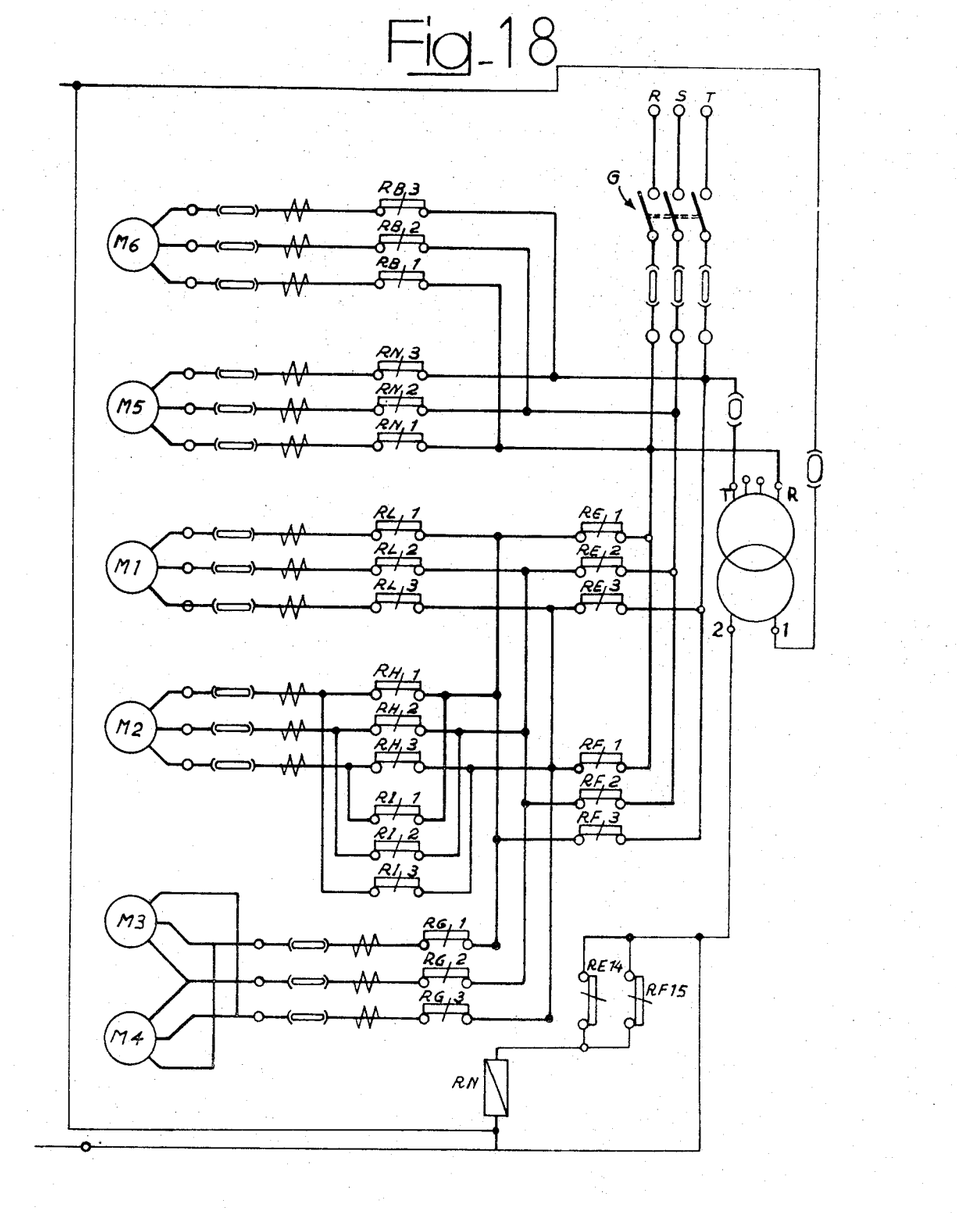
FIGS. 18 and 19 are diagrammatical views of two complementary parts of the electric circuit and related structure of the plant of the present invention.

On completion of the washing cycle on the vehicle rear, the portal frame 1 is again set in motion so that the vertical brushes 10, which are now restarted, complete washing of the vehicle sidewalls. The said brushes are drawn together at the vehicle rear to complete their cleaning cycle, as shown in FIGS. 16 and 17.

At this stage rinsing commences, for which the portal frame is set in motion in an opposite direction and carries out, in a reverse order, the previous steps, with only the difference that the direction of rotation of the brushes is reversed with respect to the corresponding previous washing steps. The sprayers 11 are now fed with water mixed with polishing additives and the sprayers 12 with pure water.

The circuit diagrams of FIGS. 18 to 23 includes the following components:

RA—6 contacts—4 make contacts=2 break contacts; auxiliary relay for forward movement.
RB—4 contacts—4 make contacts; power relay for oil pump.
RC—4 contacts—3 make contacts=1 break contact; auxiliary relay.
RD—2 contacts—2 make contacts; auxiliary relay.
RE—14 contacts—11 make contacts=3 break contacts; power relay for forward movement.
RF—15 contacts—11 make contacts=4 break contacts; power relay for return movement.
RG—4 contacts—5 make contacts=1 break contact; power relay for vertical brushes.
RH—5 contacts—4 make contacts=1 break contact; power relay for horizontal brushes=normal rotation.
RI—5 contacts—4 make contacts=1 break contact; power relay for horizontal brush reverse translational movement.
RL—6 contacts—5 make contacts=1 break contact; power relay for motor for translation of portal.
RN—3 contacts—3 make contacts; power relay for water pump motor.
RP—2 contacts—1 make contact=1 break contact; auxiliary relay.
P6—Push-button stopping translational movement.
P1—Starting push-button.
P2—Return push-button.
P3—Emergency stop push-button.
P4—Push-button for lifting horizontal brush.
P5—Push-button for drawing apart vertical brushes.
M1—Motor for translational movement.
M2—Motor for horizontal brush.
M3-4—Motors for vertical brushes.
M5—Motor for water pump.
M6—Motors for oil pumps.

M7—Timer for adjusting translation movement of the machine beyond the tail of the car being washed.
M8—Timer for adjusting the washing period on the fore and tail end of the car.
M9—Cyclic reversion of rotation of the horizontal brush for fore and tail wash.
RB—Remote control switch for oil pump.
RE—Remote control switch for forward movement.
RF—Remote control switch for reversal.
RG—Remote control switch for vertical brush motors.
RH—Remote control switch for normal rotation of horizontal brush.
RI—Remote control switch for reverse rotation of horizontal brush.
RL—Remote control switch for motor for translational movement.
RN—Remote control switch for the water pump.
rb—Thermal relay for protecting the oil pump motors.
rg—Thermal relay for protecting the vertical brush motors.
rh—Thermal relay for protecting the motor rotating the horizontal brush.
rl—Thermal relay for protecting the motor for translational movement.
rn—Thermal relay for protecting the water supply pump motor.
FC1—Limit switch for translational movement of the machine over the track.
FC2—Microswitch intercepting the horizontal brush at downmost position.
FC3—Microswitch intercepting the horizontal brush at medium high position.
m1—Microswitch for the hydraulic control for downward movement of horizontal brush.
m2—Microswitch for the hydraulic control for quick lift of horizontal brush.
m3—Microswitch for stopping translational movement.
EV15—Electromagnetic valve for hydraulic control lowering the horizontal brush carriage.
FC7—Microswitch in parallel with m3 for energizing the relay for translation movement when the brush is impeded on riding of truck.
EV4M—Fixed oil delivery electromagnetic valve for quick lift of horizontal brush carriage.
EV5—Three-way electromagnetic air valve for drawing apart vertical brushes.
EV6—Three-way electromagnetic valve for closing the vertical brushes.
EV7—Shampoo electromagnetic valve.
EV8—Polish electromagnetic valve.
I 1—Shampoo delivery switch.
I 2—Surfactant delivery switch.
S 1—Network signalling lamp.
S 2—Stall signalling lamp for motors M1-M2-M3-M4-M5-M6.
IEG—Coin released mechanism cut-off switch (if ordered).
S 4—Lamp signalling failure of air supply.

The detailed operation will now be described in connection with the circuit diagrams:

When the portal 1 is at the fore end of the guideways 7', 7" in its starting position, the switch FC1 is deflected by the cam 7C arranged near the guide 7', to position A (FIG. 19), the other contacts all being inoperative at the positions indicated on the wiring diagram.

As already explained before the machine is connected by means of flexible supply pipes 13 to a compressed air feed line, in which the pressure exceeds 3.5 atm., to the water main delivering 100 liters a minute at least at a pressure of 1.5—20 meters/$H_2O$ and to the "shampoo" and "hydrowax" reservoirs, respectively.

On closing the main switch G (see the wiring diagram of the FIG. 18), the two vertical brushes take their widest open position; this step will be clearly understood from the observation of FIG. 4.

For the contacts RE11 and RF11 which are normally closed, energize the three-way air electric valve EV5, through which the air flows to the section CA1 of the pneumatic cylinder CA and moves the piston to the right, this movement being transmitted by suitable leverages to the brush carriages which move over their respective guideways to the outside. The electromagnetic valve EV6 is disenergized and allows exhaust of air from CA2 to the outside.

Figure 3B:
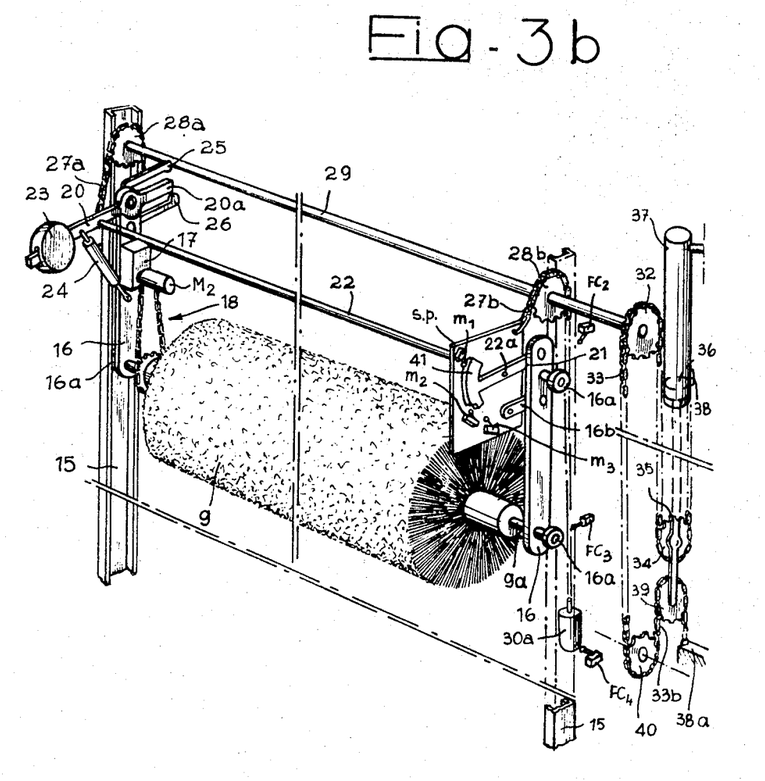
FIG. 3b is a part perspective view showing the said horizontal brush unit in its upper position.
Figure 20:
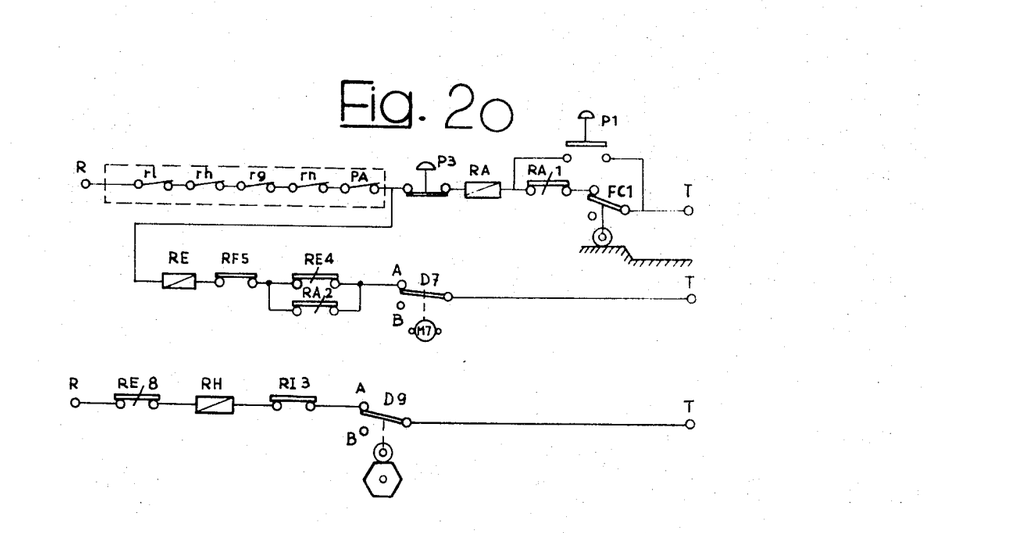
FIGS. 20 to 23 are diagrammatic views of some parts of the circuit shown in FIG. 19, illustrating the positions which various elements of the circuit assume during the operation of the plant.

The horizontal weight 30a also takes its topmost position in accordance with the part diagram in FIGS. 3b and 20.

With the brush 9 in its downmost position the limit contact FC4 is closed, consequently the relay RB is energized.

The closed relay contacts RB1, RB2, RB3 supply current to the pump motor M6, the electrovalve EV 4M is energized and therefore open, the pressure oil flows through the latter over to the hydraulic cylinder 37, the piston rod of 37 under the oil thrust moves downward and pulls the chain, consequently the brushes and carriage therefor are lifted till the weight 30a opens the normally closed switch FC4. At this stage RB is deenergized, the contacts RB1, RB2, RB3 open and stop the pump motor M6, the contact RB4 opens and deenergizes EV 4M which closes. The brush 9 remains in its top position. The microswitches $m_1$, $m_2$ and $m_3$ are controlled by the rotary sector cam 41 in the manner described hereafter.

The pushbutton switch P4 is provided for determining lifting of the horizontal brush during the wash cycle, if desired.

Figure 19:
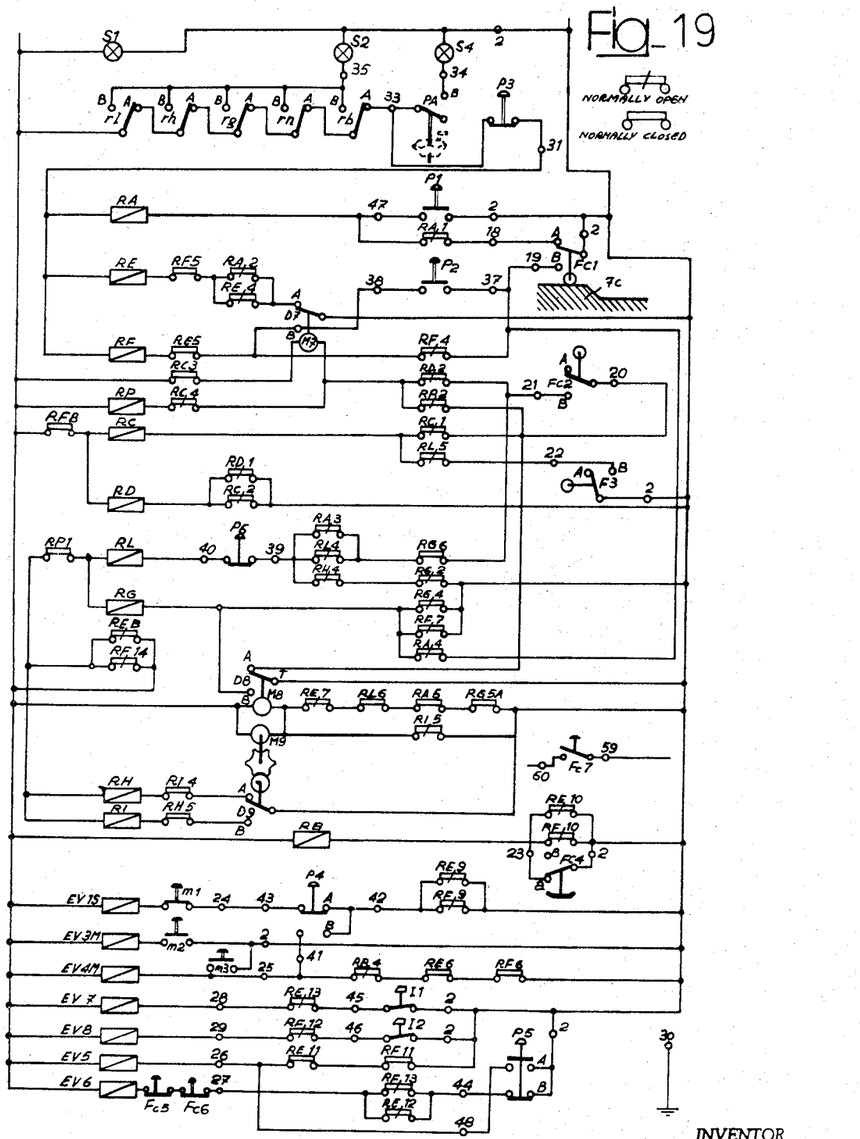

On depressing the starting pushbutton switch P1, if the thermal relays r1...rn all are in their operative condition and the air supply pressures equals or exceeds 3.5 atm. and closes the relay PA, the auxiliary relay RA is energized and is kept in this condition by the normally open contact RA1, see FIG. 19.

From FIG. 20 it may further be seen that the relay RA effects by the contact RA2 energizing of the power relay RE which in turn through RE8 energizes the power relay RH. The latter relay supplies current to the motor M2 of the horizontal brush which is thereby rotated in its normal (clockwise in FIG. 10) direction.

The contact RE10 energizes the relay RB of the oil pump M6, FIG. 3a. By rotating the pump keeps the oil at a pressure of 25 to 28 atm. ahead the electromagnetic valve EV 3M and EV 4M.

Figure 21:
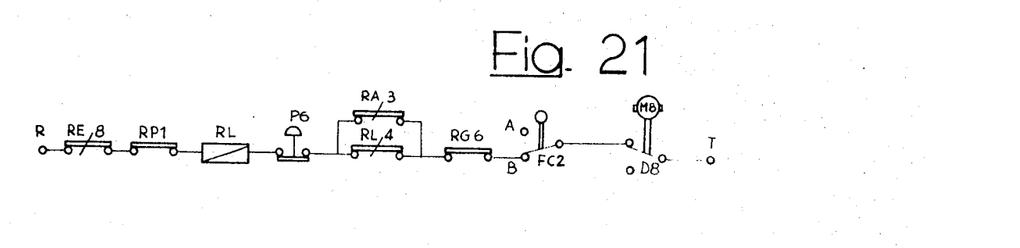
Figure 22:
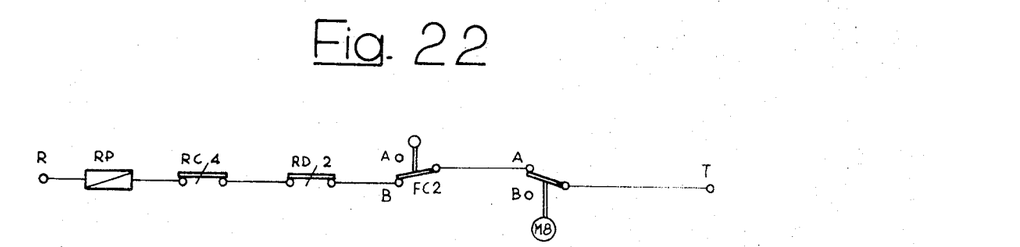
Figure 23:
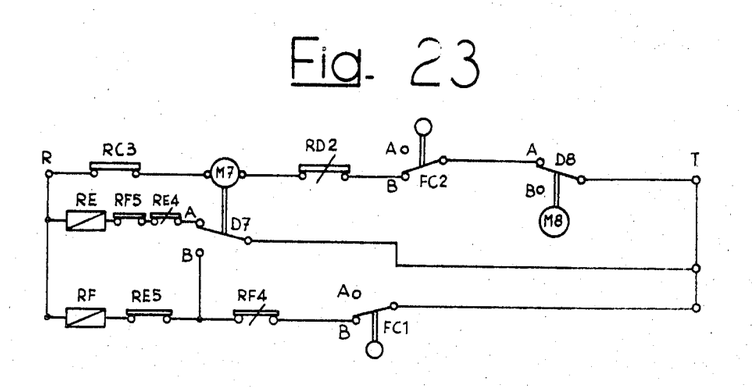

Since the brush is not yet supported by the parts of a vehicle body and is weighted, say, by 3 kgs. with respect to its balanced condition, it will move downwardly with respect to the transverse shaft 22 by the extent admitted by the mechanical limit stop 26, the brush therefore performing an overall swing by about 20 mm. In this lowered condition the brush causes the fulcrum of the lever 21 to perform a certain rotation which is conveniently transmitted to cam 41 thereby closing the microswitch $m_1$ and opening the microswitches $m_2$ and $m_3$. Consequently, the normally open now closed contact RE9, P4 and $m_1$ supply current to open discharge electrovalve EV 1S, and the oil in the cylinder 37 is discharged to the reservoir through EV 1S while the horizontal brush smoothly sinks to its downmost position. In the downmost position the weight 30a throws the movable contact of the microswitch FC2 which passes to B (FIG. 19). The power relay RL is energized and supplies through its contacts RL1, RL2, RL3 power to the motor M1 which drives the translational movement of the machine over the track. The part circuit therefor is shown in FIG. 21.

With the brush rotating in its down position ("normal" that is clockwise rotation) the machine is moved towards the car (FIGS. 10 and 11). When the brush comes into contact with the car body and the bristles start brushing the latter, as approach continues, the intensity of brushing increases and a reaction effect occurs on the brush axis, which results in lightening of the latter, as the brush is raised while the weight 23 is lowered. The cam 41 on following the steady rotation of the fulcrum to which it is connected, releases the microswitch $m_1$ which opens, thereby deenergizing EV1S and closing discharge of oil from 37, the further rotation of the cam 41 closing first $m_2$, then $m_3$. These microswitches control EV 3M, EV 4M, respectively, which are electromagnetic delivery valves. Pressure oil flows therethrough to the cylinder 37, presses its piston and raises the horizontal brush 9 till the cam 41 reaches an intermediate position between the microswitches $m_2$ and $m_1$. This new position of the brush is maintained till a variation in profile of the car body alters the established balance and effects a further relative movement of the cam with respect of the switches $m_1$, $m_2$ and $m_3$ in one direction or the other, thereby moving the horizontal brush unit either upwardly or downwardly.

The contact RE13 energizes the electromagnetic valve EV7 (see FIG. 19) for the shampoo which is allowed to flow to the washing water, the contact RE11 opens and deenergizes the electromagnetic compressed air supply valve EV5 (see also FIG. 19) the movable core of which descends and thereby connects the chamber CA1 of the cylinder CA with the atmosphere, the contact RE12 closes and energizes the electromagnetic compressed air supply valve EV6 the movable core of which rises and allows flow of air at a pressure of 1.2—1.5 atm. to the chamber CA2 of the cylinder CA and cuts the communication with the atmosphere, thereby transmitting the necessary thrust to the vertical brushes for washing the sides of the car body, the vertical brushes now taking a closed position, the movable cores of the valves EV5 and EV4 assuming positions opposed to that shown in FIG. 4.

The forward movement of the portal frame 1 releases the microswitch FC1 of the cam on the track 7 which closes the contact B and opens A. This deenergizes RA and arranges the circuit for scrubbing by engaging relay RF.

At this stage the dynamic conditions of the machine are as follows:

1. Horizontal brush 9 rotates normally occupying its downmost position,
2. The vertical brushes 10 are close to each other and do not rotate,
3. The portal frame 1 approaches the car 84 to be washed by travelling over the track,
4. The pipe 11 delivers water for prewash,
5. The pipe 12 delivers water and shampoo.

The horizontal brush 9 approaches the fore end of the car and impinges thereon. The ensuing reaction on the brush 9 reduces the weight of the latter, consequently the counterweight 23 sinks, FIG. 3a, and the cam 41 coaxial with the fulcrum of the lever 21 rotates in the clockwise direction, first releasing $m_1$ which opens, then progressively closing $m_2$ and $m_3$ which energize the electromagnetic valves EV 3M and EV 4M.

By opening these two electromagnetic valves admit flow of pressure oil to the cylinder 37, which raises the horizontal brush 9. The upward movement of the latter stops when the reaction, hence the reduction in weight are such that the cam takes a neutral position between the microswitches $m_1$ and $m_2$, leaving both open.

At the same time, as the horizontal brush 9 moves upwardly and performs the above described process, the limit switch FC2 has been returned to position A, RL is deenergized, the translational movement of the machine stops and the contacts RE7, RL6, RA5, RG5A, which are all closed, permit rotation of the timer M8 and of the "cyclic" motor M9, (FIG. 19).

As the timer M8 starts counting time (adjustable from 0 to 45 sec.), the cyclic motor M9 periodically (5 seconds per cycle ) energizes RH and RI thereby effecting normal and reverse rotation of the brush 9 against the fore end of the car.

These reversals of the brush still cause by reaction an increase and decrease in weight, respectively, of the brush 9 and rotation in alternating directions of the cam 41 which, by acting on the microswitches $m_1$, $m_2$, $m_3$ synchronously effects lifting and sinking of the horizontal brush unit.

On expiry of the timed period M8 deflects the movable contact D8 from A to B.

The power relay RG is energized and closing the contacts RG1, RG2 and RG3 supplies the motors M3 and M4 (see FIG. 19) which rotate the vertical brushes. Simultaneously it cuts out, through contact RG 5A, electric current supply from M8 and M9.

If the timer M8 performs its function at a time when the switch D9 is at position B and RI is energized (so that the brush 9 would rotate in a reverse direction), the contact R15 would further feed M9 and M8 till D9 under the control by M9 is displaced to A, deenergizing RI, energizing RH, and deenergizing both M8 and M9 (owing to opening of RI5).

The normally open contacts RG2 and RH4 would permit energization of the relay RL for closing the normally open contacts RL1, RL2 and RL3 (see FIG. 18), and to restore thereby translational movement of the portal frame 1.

Consequently, the dynamic conditions of the plant at this stage are:

1. The portal frame 1 travelling over the track 7,
2. Horizontal brush rotating "normally" and washing the car body,
3. Vertical brushes 10 rotating and washing the fore end and sides of the car body,
4. The pipe 11 delivering water for prewash,
5. The pipe 12 delivering water and shampoo for wash.

The energized relays are: RE, RL, RG, RH, RB, RN, the electromagnetic valves EV7, EV6, and, depending upon the shape of the profile of the car body EV 1S, EV 3M, EV 4M.

When the horizontal brush starts riding up the windshield of the car the weight 30a acts on the microswitch FC3 which is moved though briefly to position B. Since RL5 is closed, the auxiliary relay RC is energized and so maintained with the contact RC1 closed; while the contact RC2 closes energizing the relay RD. These two auxiliary relays prearrange the function of the circuits of relay RP and of the timer M7 during the return stroke of the portal frame 1 towards the starting position shown in FIG. 1.

The dynamic conditions of the plant remain the same till the horizontal brush 9 completes its washing cycle, more particularly, it has reached the rear bumpers of the car for washing.

At this stage the brush 9 occupies again its lowest position and the weight 30a again engages the switch FC2 which is displaced from A to B. This energizes the auxiliary relay RP (as shown in the part diagram of FIG. 22), and intercepts current to RL and RG by means of the opening contact RP1, which deenergizes the relays RL and RG, thereby stopping the translational movement of the portal 1 as well as rotation of the vertical brushes 10.

The horizontal brush 9 now washes the tail of the vehicle reciprocating in exactly the same manner as it did washing the front of the vehicle. The timer M8 will again start its function, as well as the cyclic motor M9 which alternatingly switches on RH and RI. At this time the energized relays are: RE - RC - RD - RP - RH - RI - RN - RB.

On expiry of the timed period the timer M8 switches the deflector D8 from A to B so that RC and RP are deenergized, the contact RP1 closes, engaging RL and RG; at the same time, D8 and closes RG 5C thereby permitting energization of RL. The vertical brushes 10 again start rotating (in the same direction as before) and the portal 1 resumes travel in the same direction as before. At this stage the horizontal brush 9 which is no longer supported by the car body sinks to its downmost position and the weight engages the switch FC2 which is displaced to B and switches on the timer M7 the latter having been prearranged, as explained above, for a period permitting the portal 1 to travel beyond the car being washed, whereby the vertical brushes 10 close on the tail of the car for more efficient wash.

The energized relays at this time are: RE - RD - RL - RH - RB - RN and the timer M7.

On expiry of the pretimed period M7 switches D7 over from A to B; RE becomes deenergized, RF is energized and switches the feed circuit for the motors M1-M2-M3-M4, thereby reversing rotations and causing the portal 1 to travel towards its starting position. Energization of RF opens RFB which deenergizes RD, RD2 opens too, the timer M7 is deenergized and moves D7 from B to A; RF remains self-energized by RF4 and the switch FC1 which is at position B (see FIG. 23). The power relay RB for the oil feed motor M6 is further on through RF10 and so is the relay RH for the horizontal brush driving motor M1, which is energized by RF14. The electromagnetic valve for the shampoo feed EV7 becomes deenergized and intercepts outflow of the latter, the electrovalve EV8 for the wax or polish is energized by the contact RF12 and delivers the hydrodetergent to prewash pipe 11. The working thrust upon the lateral brushes 10 is afforded by contact RF13.

The normally open contact RF7 maintains the power relay RG energized and so do the contacts RH3 - RG 2 and the relay RL for the return translation movement of the portal 1. On completion of the rinsing and polishing step, the portal reaches its starting point on the track and stops when the limit switch FC1 rides on the cam and switches from B to A. RF is thereby deenergized as well as all the relays; the relay RB for energizing the motor M3 driving the oil pumps remains switched on till the upward movement of the horizontal brush 9 opens the microswitches FC4 which in turn deenergizes RB.

The vertical brushes are drawn apart, as EV5 is now energized by the normally closed contacts RE11 and RF12.

It will be obvious from the above description that a plant according to the invention and as described, effects in a rapid and fully automatic manner, the washing of vehicles without any manual operation. The plant is of reduced size and may thus be installed within limited spaces although vehicles of considerable length can be washed due to the auxiliary slide arrangement whereby the vehicle can be moved in a direction opposite to that of the portal frame.

Various modifications of the invention are of course possible within the scope of the appended claims. For instance, where, in preceding descriptive passages, the use of chains has been described these may be readily replaced by belts.

As will be seen from the foregoing description the operation of the plant can be released by acting on two controls only, namely by closing the main switch G and thereafter depressing the starting pushbutton P1.

However, the plant is equipped with further controls which make it possible to return the portal (pushbutton P2 and emergency pushbutton P3) lift the horizontal brush 9 (pushbutton P4), and draw apart the vertical brushes 10 (pushbutton P5). All these controls are preferably located on a common control-board (not shown) suitably disposed at one side of the plant, preferably near the starting position of the portal frame 1.

We claim:

1. An automatic plant for washing vehicles, the plant being of the type comprising a portal frame movable relative to the vehicle to be washed and carrying a horizontal brush rotatable about a horizontal axis and displacable vertically in the portal, and two vertical brushes rotatable about vertical axes and movably mounted to move toward and away from one another while being carried by the portal, with the improvements comprising; an automatic control means for controlling movement of the portal and of the horizontal vertically displacable brush such that when the portal and vehicle are relatively positioned so that the brush rotatable on the horizontal axis contacts the front of the vehicle, the automatic control means including a timing means control stopping of the relative movement of the portal and vehicle and causing the horizontal brush to reciprocate vertically up and down to wash an end of the vehicle.

2. An automatic plant for washing vehicles as in claim 1 wherein the automatic control means includes brush position control means which are activated by contact of the horizontal brush with the end of the vehicle in order to automatically effect lifting and lowering of the brush by reaction of the brush contact with the end of the vehicle providing an upwardly directed thrust.

3. An automatic plant for washing vehicles as in claim 2 wherein the brush position control means includes a means for counterweighting the weight of the vertically displacable horizontal brush and electric sensing means actuatable by the position of the horizontal brush relative to its counterweighting means.

4. An automatic plant for washing vehicles as in claim 1 wherein the automatic control means further includes sensing means sensing the position of the brush during its movement vertically.

5. An automatic plant for washing vehicles as in claim 1 wherein the portal is driven by a motor, the control of said motor being included in the automatic control means.

6. An automatic plant for washing vehicles as in claim 1 further comprising an auxiliary carriage for supporting wheels of the vehicle to be washed, and means for moving the carriage in a translational direction opposite to the movement of the portal to reduce the space required for washing the vehicle.

7. An automatic plant for washing vehicles as in claim 1 wherein the automatic control means includes an electric circuit with switch means for sensing the following: a predetermined low vertical position of the horizontal brush relative to a counterweight therefore, a longitudinal limit position of the portal frame movable relative to longitudinal guides therefore, a vertical position of the horizontal brush and further comprising switch means for sensing an outward limit transverse position of the vertical brushes.

8. An automatic plant for washing vehicles as in claim 1, wherein the horizontal brush is supported by a unit which comprises two vertical rods slidably mounted in vertical guideways in the portal, and two horizontal levers, the two vertical rods being articulated at their tops each to a said horizontal lever, the unit further comprising a pivot rod to which the said horizontal levers are attached, and an adjustable counterweight mounted on one of the levers for counterbalancing a portion of the weight of the horizontal brush, the automatic control means further comprising a cam being provided together with a plurality of microswitches, the cam being carried by the other said lever and adapted to engage the plurality of microswitches, which latter are arranged to control the means for vertically reciprocating the horizontal brush.

9. An automatic plant for washing vehicles as in claim 8, wherein the said lever carrying the counterweight is provided with stroke limit stops.

10. An automatic plant for washing vehicles as in claim 9, further comprising: a top shaft rotatable by the said means for vertically reciprocating the brush, there being further provided chains and toothed pinions, the said horizontal levers being each supported at their fulcra by the said chains which travel over the said toothed pinions, which latter pinions are on the top shaft.

11. An automatic plant for washing vehicles as in claim 10, wherein the reciprocating means for the brush comprise a fluid pressure cylinder having a piston rod, a free wheel for an elongated member travelling over a wheel fast with the said top shaft, and a fluid supply and exhaust circuit for the said cylinder controlled by magnetic valves, the piston rod of the fluid pressure cylinder acting upon the said free wheel and the said magnetic valves being operable by the said microswitches cooperable with the said cam, so that an upward or downward thrust on the said horizontal brush respectively lifts or lowers the said brush and the supporting means therefor thereby to adjust and maintain constant the force with which the said brush acts upon a said vehicle body, which latter said force is dictated by the said supporting means.

12. An automatic plant for washing vehicles as in claim 11 wherein the elongated members comprise belts running over pulleys.

13. An automatic plant for washing vehicles as in claim 10, wherein a pair of weights are provided, the automatic control means including a microswitch and a timer, the chains being provided each with a said weight, one of which weights cooperates with the said microswitch to operate the said timer when the said horizontal brush is lowered, as at the front or rear of a vehicle, the said timer being arranged to reverse rotation of the said brush, to effect repeated vertical reciprocations of the said brush and to halt the portal frame to wash the front and rear vehicle portions.

14. An automatic plant for washing vehicles as in claim 1 further comprising, a guideway above the top of each vertical brush and a carriage for each vertical brush, the guideway having, at each of its opposite top and bottom surfaces, two bevelled surfaces which provide guide tracks for pairs of inclined rollers carried by two ledges on each carriage, one of which said ledges is adjustable.

15. An automatic plant for washing vehicles as in claim 14, wherein each carriage carries at the top thereof operating means for the vertical brush thereof.

16. An automatic plant for washing vehicles as in claim 14, wherein the two carriages for the vertical brushes are interconnected by levers and a control means for the vertical brushes comprising a double acting fluid pressure cylinder so connected to the levers that by charging the cylinder the two brushes are drawn apart and vice versa.

17. An automatic plant for washing vehicles as in claim 1, wherein there is provided an electric control means adapted to reverse rotation of the said brushes when the portal frame performs its return stroke for rinsing and means to control supplies of water, detergent, and a polishing additive so that during an initial pass sprayers on the portal frame spray washing water and water mixed with detergent, and on a return pass the sprayers spray water admixed with a polishing additive and rinsing water.

18. An automatic plant for washing vehicles as in claim 1, wherein the bristles of each said brush are carried by flexible members adapted to encircle their respective shafts, the members being provided with radial wings engaged by metal straps secured by means of screws to the shaft.

19. An automatic plant for washing vehicles, the plant being of the type comprising a portal frame movable relative to the vehicle to be washed and carrying a horizontal brush rotatable about a horizontal axis and displacable vertically in the portal, and two vertical brushes rotatable about vertical axes and movably mounted to move toward and away from one another while being carried by the portal, with the improvements comprising: an automatic control means stopping relative movement of the portal and vehicle and causing the horizontal brush to start a series of upward and downward movements at the end of the vehicle, the horizontal brush being rotated in a direction such that when the horizontal brush contacts the end of the vehicle reaction of the rotating brush and vehicle force the brush upwardly actuating a control member of the automatic control means to reverse the rotation of the brush and start downward movement.

20. An automatic plant for washing vehicles as in claim 19 wherein control member is adjustable in height and includes stop actuated switches.

21. An automatic plant for washing vehicles as in claim 20 further comprising a timer to determine the number of upward and downward movements of the horizontal brush.

22. An automatic plant for washing vehicles as in claim 19 wherein the automatic control means includes a member actuated when the horizontal brush moves upwardly to wash the roof of the vehicle to condition the automatic control means to cause the brush to carry out a series of up and down scrubbing movements at the rear of the vehicle.